United States Patent [19]

Quinn et al.

[11] Patent Number: 5,751,972
[45] Date of Patent: May 12, 1998

[54] SYSTEM FOR RUN-TIME CONFIGURATION OF NETWORK DATA TRANSFER PATHS

[75] Inventors: Michael Quinn, Campbell; Michael B. Shoemaker, San Jose, both of Calif.

[73] Assignee: Apple Computer, Inc., Cupertino, Calif.

[21] Appl. No.: 412,154

[22] Filed: Mar. 28, 1995

[51] Int. Cl.$^6$ .............................. G06F 9/00; G06F 13/00
[52] U.S. Cl. .............................................. 395/200.1
[58] Field of Search ................................ 370/85.8, 449, 370/450, 451, 452, 453; 395/200.01, 200.02, 200.1, 200.12, 200.13, 200.15, 856, 858; 364/514 C, DIG. 1

[56] References Cited

U.S. PATENT DOCUMENTS

| | | | |
|---|---|---|---|
| 5,381,534 | 1/1995 | Shi | 395/200.03 |
| 5,513,127 | 4/1996 | Gard et al. | 395/500 |
| 5,546,301 | 8/1996 | Agarwal et al. | 395/650 |

FOREIGN PATENT DOCUMENTS

0555997A2  8/1993  European Pat. Off. .

OTHER PUBLICATIONS

Kogan, M.S., et al, "The design of Operating System/2", *IBM Systems Journal*, vol. 27, No. 2, 1988.
Tschudin, Christian, "Flexible Protocol Stacks", *Computer Communication Review*, Sep. 21, 1991, No. 4.
LaMonica, Martin, "Neuron helps distribute apps; middleware manages app partitioning, network protocols", Info-World, p. 23, Jul. 3, 1993.
Illegen, J.D., Fong, N.R., Lapman, G.B., "Automated simulation/model management to support the tes/evaluation process", proceedings of 1994 Summer Computer Simulation Conference, Jul. 1994.

The DYCE concept—Architecture & Implementation Strategies, Heinrichs et al., IFIP Transaction, pp. 189–200, 1994.

*Primary Examiner*—Benedict V. Safourek
*Assistant Examiner*—Seema S. Rao
*Attorney, Agent, or Firm*—Burns, Doane, Swecker & Mathis, L.L.P.

[57] ABSTRACT

A system which enables new data paths that form different network configurations to be constructed during the run time of the computer determines whether a given configuration specified by a user is legitimate, and if so, creates a data path. In operation, a user issues a command to open a data path containing a particular protocol module. In response, an open handler inquires whether the particular configuration specified by the user is proper. This inquiry is sent to individual configurators, which comprise shared libraries containing routines pertaining to the various protocols stored in the computer. A configurator responds to the inquiry if it contains information pertaining to the protocol identified by the user. The routines in the configurator also indicate whether the protocol module can be connected in a legitimate configuration. If it can, a data path is created. If the particular connection specified by the user is not proper, the configurator routine identifies a different code module to which the specified protocol module can be properly connected. This process continues in a recursive manner, until a legitimate configuration is found. A data path is then constructed in accordance with this configuration.

18 Claims, 5 Drawing Sheets

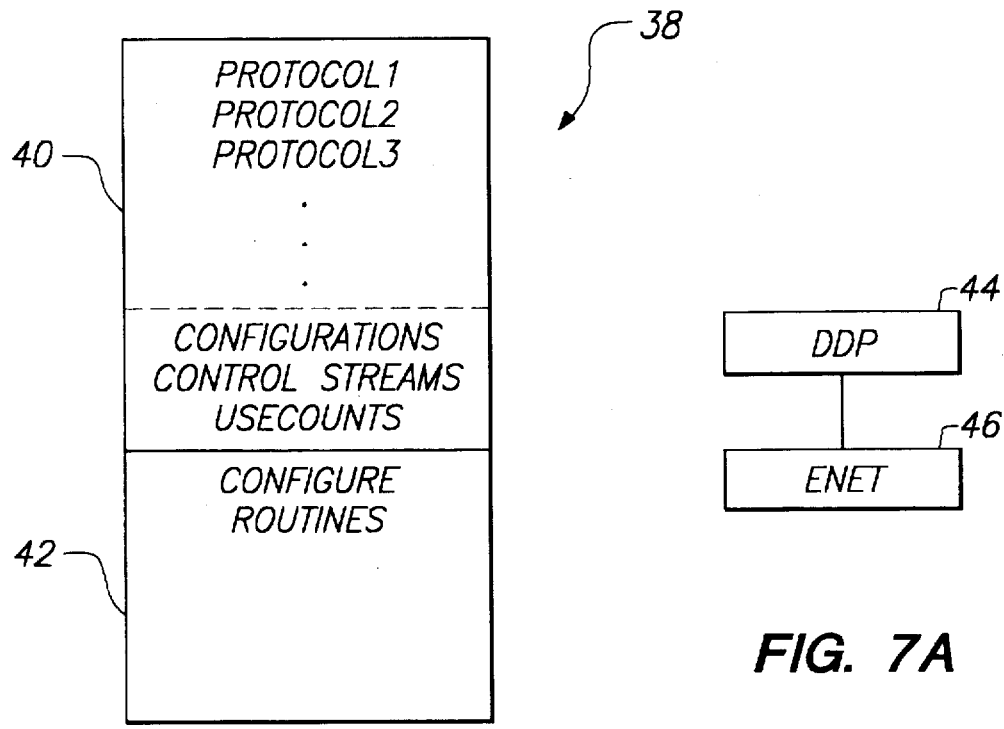
FIG. 6
FIG. 7A
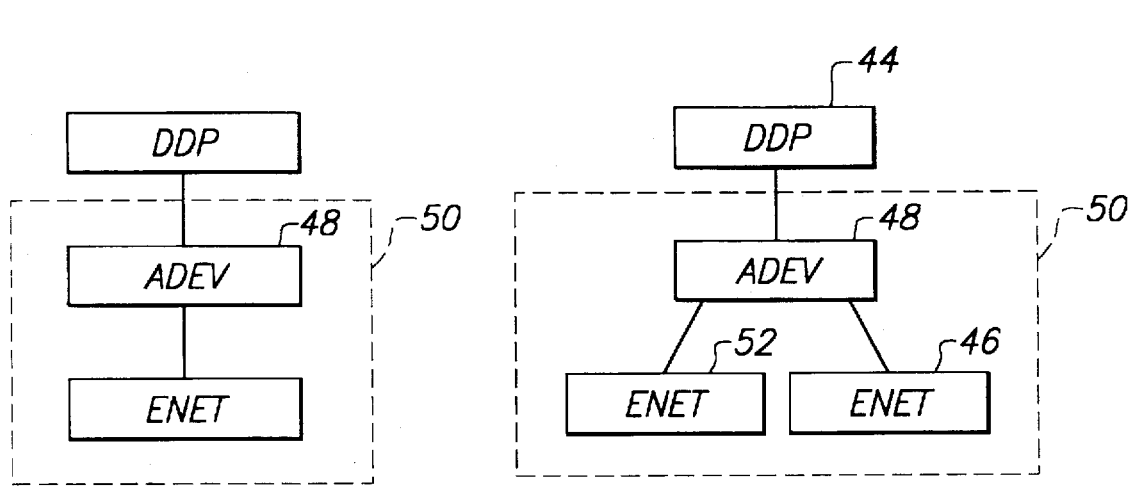
FIG. 7B
FIG. 7C

SYSTEM FOR RUN-TIME CONFIGURATION OF NETWORK DATA TRANSFER PATHS

FIELD OF THE INVENTION

The present invention is directed to computer networks, and more particularly to a system for dynamically configuring a computer, during run time, to establish a data transfer path for communications over a network.

BACKGROUND OF THE INVENTION

For two or more computers to exchange data with one another over a network, their communications must conform to an established protocol. Typically, different protocols are associated with particular services or tasks, such as data packaging or packet routing. A given protocol specifies rules for setting up, carrying out and terminating a communications connection. The protocol may also specify the format that information packets must have as the information is transmitted from one point on the network to another.

A computer connected to a network must be configured so that the information which it sends over the network conforms to the protocol. Typically, this configuration is accomplished by establishing a data transfer path within the computer. This data transfer path is interposed between user processes that are running on the computer, e.g. application programs, and the hardware which provides the physical connection to the network. In the UNIX operating system, for example, the data transfer path is established by means of the "streams" facility. A stream is a communications path that is established between an I/O device and a user process. Typically, a stream includes a head end, which communicates with the user process, a driver that handles data transfers between the operating system and the I/O device, and one or more modules between the head end and the driver. Each module processes data transferred between the network and the computer in accordance with a designated protocol.

A separate module is employed for each different protocol that is to be used, and multiple modules can be linked together to form any desired configuration. In the UNIX operating system, for example, various modules are configured to form a stream by commands to "Open" a module, to "Push" one module above or below another, and/or to "Link" one module to another. Because there are a large number of different types of modules, many different configurations are possible. However, not all possible configurations will work. For example, a module for the Datagram Delivery Protocol (DDP) can be linked to a device driver for an Ethernet network architecture. However, the AppleTalk Data Stream Protocol (ADSP) is not compatible with the Ethernet architecture. Thus, a stream in which an ADSP module is directly linked to an Ethernet driver would not form a workable connection.

In addition, configuring a workable stream commonly requires detailed knowledge of the implementation of the protocol modules. For instance, to create a stream consisting of the DDP protocol operating with Ethernet, it is not enough to open an Ethernet driver and push a DDP module onto it. Most protocols require complex "plumbing" in order to become operational. For example, to implement a stream containing a DDP module over an Ethernet driver requires the operations of "opening" a DDP module, "opening" two Ethernet drivers, and then "linking" the Ethernet drivers beneath the DDP module. This creates a DDP control stream. From that point on, creating a new DDP stream only requires "opening" a DDP module.

To avoid problems associated with unworkable data transfer paths, configuration information is typically set up using a daemon process, i.e. one which runs in the background and is transparent to the user, and system configuration files supplied by a network administrator. Subsequently, when the computer is booted, the daemon process retrieves the information stored in the configuration file and configures the computer to set up the proper streams with the modules connected in a manner that is workable.

One limitation associated with this approach is the fact that the configuration of the computer to set up a data stream is carried out by certain processes that typically operate only when the computer boots up. These processes run in the background, without any user awareness of their operation, and are referred to as "daemon" processes. An application is not able to specify a new configuration and use it without modifying configuration files and starting up a new daemon process to create a protocol stack. It is not currently possible to dynamically create a stream for a protocol family that is not set up ahead of time by one of the daemon processes.

SUMMARY OF THE INVENTION

It is desirable, therefore, to provide a system which enables new data paths that form different network configurations to be constructed during the run time of the computer. In accordance with the present invention, such an objective is achieved by means of a system which dynamically determines whether a given configuration is legitimate, and if so, creates a data path during run time. In operation, a user issues a command to open a data path containing a set of protocol modules, and optionally a device driver. In response, an open handler inquires whether the particular configuration specified by the user is proper. This inquiry is sent one by one to a number of software modules called configurators, which comprise shared libraries containing routines pertaining to the various protocols stored in the computer. The open handler first inquires which configurator can handle the topmost protocol module in the user-specified configuration. A configurator responds positively to the inquiry if it contains information pertaining to the protocol identified by the handler. If it does not contain information pertaining to the protocol requested for configuration, it will respond negatively, so that the open handler can go on to the next configurator. Once the appropriate configurator is identified, it is asked to configure the specified module. The routines in the configurator decide whether the given module can use the next module specified in the desired configuration. In order to do so, the configurator may decide to add one or more modules to the path. Once the configurator has determined that the topmost two modules are compatible, the process is continued in a recursive manner, until either a legitimate configuration is created, or a determination is made that one cannot be created. A data path is then constructed in accordance with the legitimate configuration.

Further features of the present invention, as well as the advantages offered thereby, are explained in greater detail hereinafter with reference to specific embodiments illustrated in the accompanying drawings.

BRIEF DESCRIPTION OF THE DRAWINGS

FIG. 6 is a block diagram of the structure of a configurator;

FIGS. 7A, 7B and 7C illustrate respective states in the construction of a first example of a user-commanded configuration for a stream;

FIGS. 9A, 9B and 9C illustrate respective states in the construction of a third example of a user-commanded configuration for a stream.

DETAILED DESCRIPTION

To facilitate an understanding of the principles which underlie the present invention, it is described hereinafter with reference to its implementation in a particular embodiment. Specifically, the invention is described in the context of the UNIX operating system, with particular reference to the construction of streams for internetwork configurations. It will be appreciated, however, that the practical implementations of the present invention are not limited to this particular embodiment. Rather, the invention will find utility in any environment in which it is desirable to configure a computer for different types of internetwork communications during the run time of the computer without having to set them up at boot time, and where protocol implementations are discrete modules rather than monolithic entities.

Figure 1:
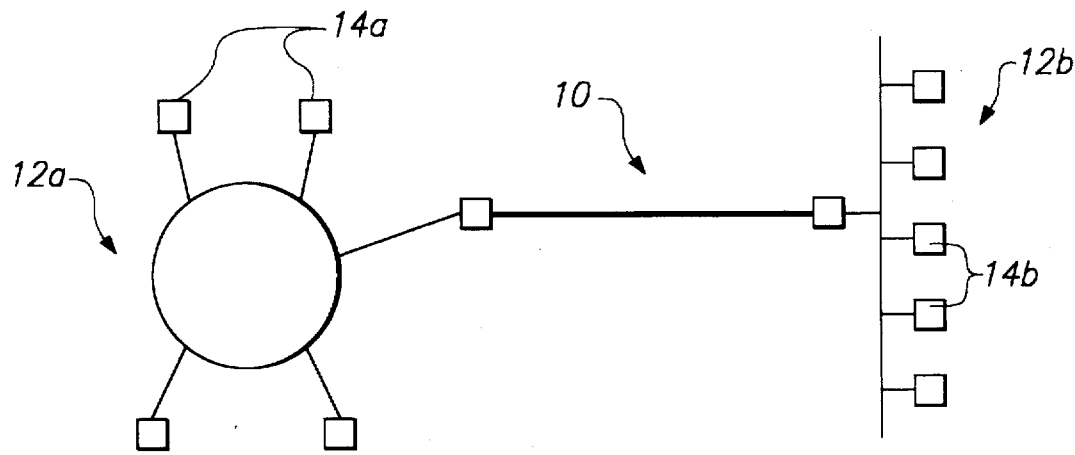
FIG. 1 is a schematic diagram of an exemplary wide-area network.

An example of a network in which the present invention might be employed is illustrated in FIG. 1. The architecture of the network does not form part of the invention itself. Rather, it is described herein to provide a more thorough understanding of the environment in which the invention operates. The particular example illustrated in FIG. 1 is a wide-area network 10 that includes two subnetworks, namely local-area networks 12a and 12b. Each of the subnetworks includes a number of computers 14a, 14b which can be connected by means of various topologies. For example, the computers 14a on the local-area network 12a might be connected via a token-ring architecture, whereas those on the local area network 12b might be connected via an Ethernet architecture. Depending upon the particular architecture that is employed, the various subnetworks may use different sets of protocols for communications among the computers within the local-area networks. For example, the token ring network 12a might employ the IP and DDP protocols, and the Ethernet network might employ the DDP and IPX protocols. Accordingly, each of the computers in the respective networks must be configured to transmit and receive information in accordance with the established protocols.

Furthermore, a different protocol, such as X.25, may be employed to transmit information between the different subnetworks via the wide-area network 10. Consequently, the computers on the various subnetworks may need to be configured to send and receive information via a first set of protocols, for communications within the local-area network, and via a second set of protocols, for communications over the wide-area network.

The particular manner in which the computers are configured to operate in accordance with the different protocols can vary from one computer type to another. In general, however, the configuration is carried out by establishing a data path within the computer between a user process, such as an application program or operating system service, and the I/O device which provides the connection to the network. Data which travels over this path is processed in accordance with one or more protocols associated with that path. In a computer which runs on the UNIX operating system, such a data path is constructed as a "stream".

Figure 2:
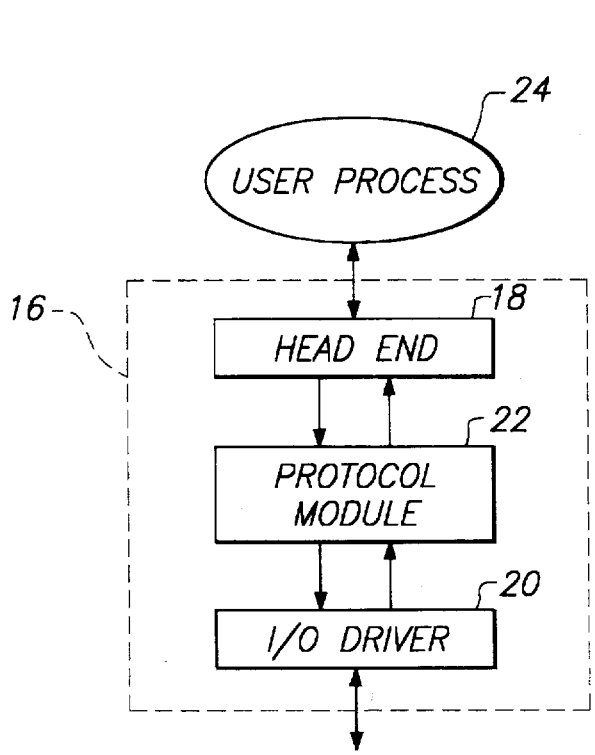
FIG. 2 is a block diagram of a stream.

Generally speaking, a stream in the UNIX operating system is a full-duplex processing and data transfer path between a device driver in the kernel space of the operating system and a process in the user space of the computer's memory. Referring to FIG. 2, a stream 16 comprises a head end 18, a driver 20 and one or more protocol modules 22 between the head end and the driver. The head end 18 is the portion of the stream that is nearest to the user process 24. All system calls that are made by a user-level process to a stream are processed by the head end. The driver 20 is a device driver that handles data transfer between the kernel and the I/O device which connects the computer to the network. For example, the driver might be associated with an Ethernet connection, an ARCnet connection or a token ring connection.

Each protocol module 22 carries out processing functions that are to be performed on data flowing in the stream in accordance with the protocol it represents. This data processing may involve changing the way the data is represented, adding or deleting header and trailer information, and/or packetizing and depacketizing data, depending upon the requirements of the particular protocol.

Figure 3:
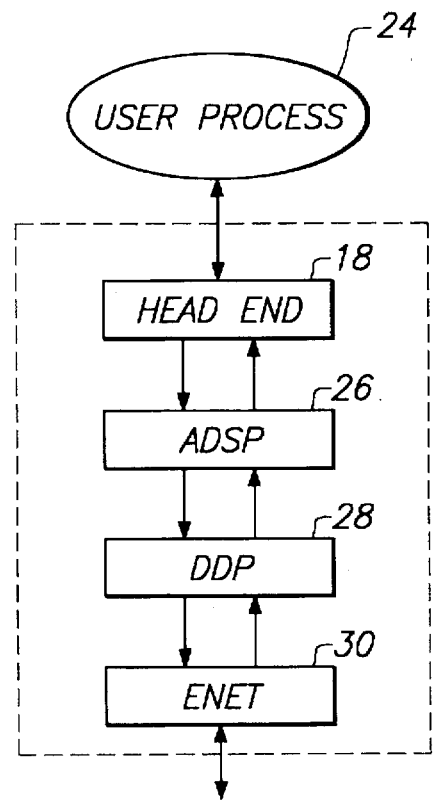
FIG. 3 is a first example of a stream configuration.
Figure 4:
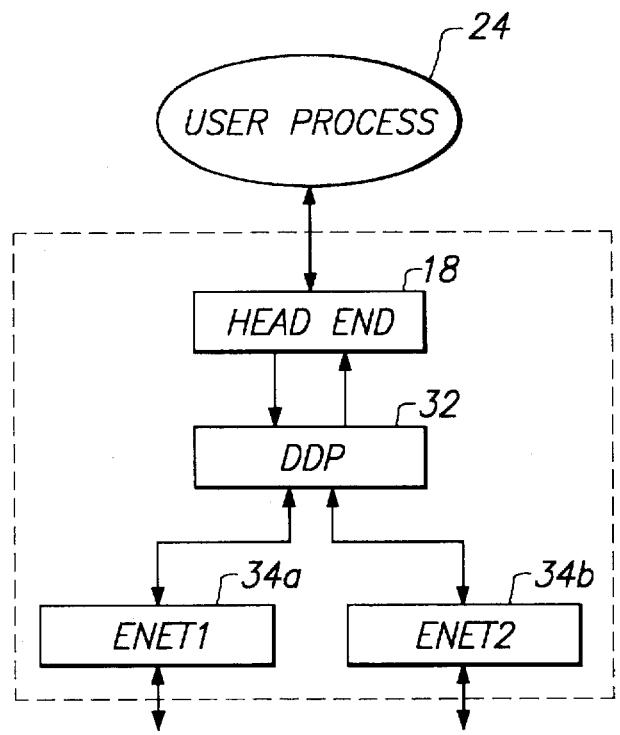
FIG. 4 is a second example of a stream configuration.

Any number of modules can be present in the stream between the head end and the driver. For example, FIG. 3 illustrates a stream in which an ADSP module 26 is located above a DDP protocol module 28, which communicates with an Ethernet driver 30. Furthermore, multiple drivers can be present within a stream, for example to connect a single module with any one of a number of different I/O devices. FIG. 4 illustrates a data stream in which a single DDP protocol module 32 is functionally connected to two individual Ethernet device drivers 34a and 34b collectively referred to herein as function modules.

Figure 5:
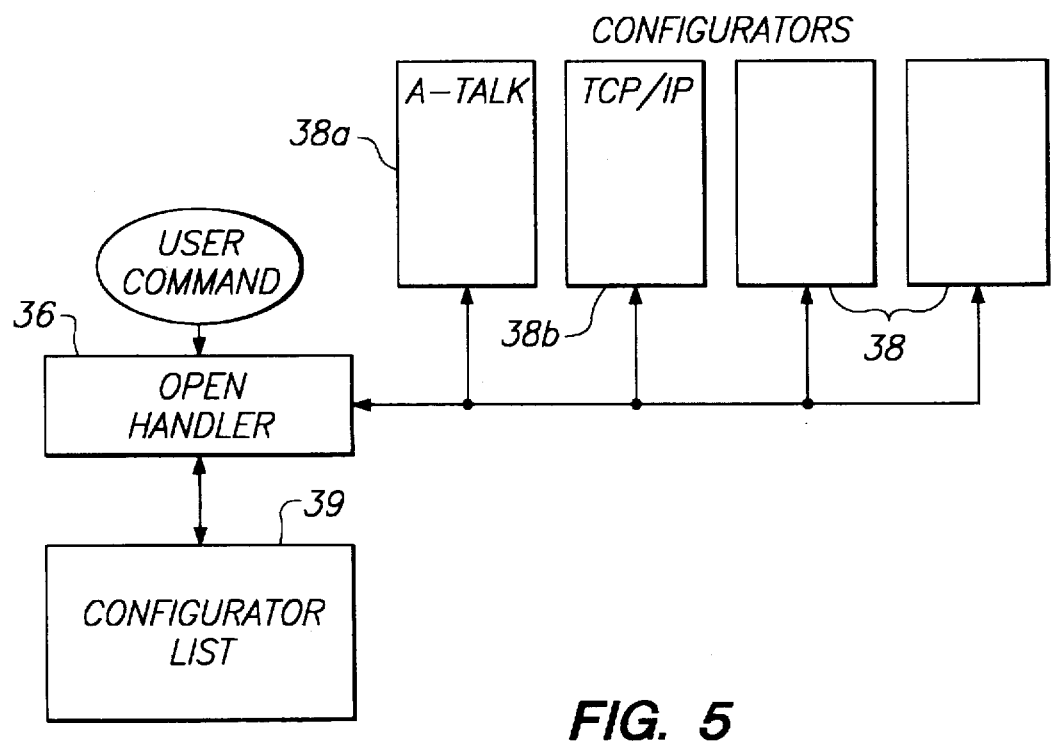
FIG. 5 is a block diagram of the system for dynamically configuring a stream.

In accordance with the present invention, streams of this type can be constructed at any time while the computer is running. FIG. 5 is a block diagram of the architecture of the system for providing this functionality. Typically, this structure will form part of the operating system for the computer. Referring to FIG. 5, the system includes an open handler 36 which responds to a user command to open a particular stream. Associated with the handler are a number of shared libraries 38 that are referred to herein as "configurators". Each configurator is associated with a different type of network architecture. For example, one configurator 38a might be associated with the Appletalk network architecture, and another configurator 38b can be associated with the TCP/IP architecture. Configurators can also be associated with drivers, where the driver may be complex. For example, a Point-to-Point Protocol (PPP) driver is typically composed of several modules all cooperating together, and located in the data path above a serial port.

Each configurator contains a list of one or more protocols that are appropriate for its associated architecture, as well as a method for determining what modules may sit below it in a data path, and a method for determining default modules when none are specified. The method for determining which modules can be located below a given protocol module may be as simple as a list of the legal modules and driver names, or as complex as a dynamically-loaded shared library methodology. The determination of the default modules that can reside below a given protocol module is typically determined by either hard-coded rules, or preference (configuration) information stored in the system.

A list 39 of all of the configurators in the computer system is stored with the open handler 36. Each configurator 38 registers itself with the list 39, for example at boot time, so that its existence is known to the open handler.

In the general operation of the system shown in FIG. 5, a two-step process is carried out to create a legitimate configuration. Initially, a user commands the open handler 36 to open a stream containing one or more specified protocol modules. In the first step of the process, the open handler sequentially polls the configurators 38 to determine which one can configure the first module in the proposed configuration. When one of the configurators responds that it can configure the module, the open handler instructs the configurator to configure the module. This two-step operation is repeated for each of the modules in the stream, until a legitimate configuration is created, or a determination is made that a legitimate configuration cannot be created.

Once the open handler has created a legitimate configuration (i.e. the configuration was created with no error), the open handler then asks the configurator for the topmost module to create the stream. This configurator then recursively invokes the open handler to ask the configurator for the next module down to create that stream. Once the stream for the next module down is created, the original configurator then does whatever "plumbing" is necessary, i.e. opening, pushing and linking of modules, to finish creating the stream.

In the preferred embodiment of the invention, each of the configurators 38 comprises two main portions, represented in FIG. 6. One portion 40 is initially loaded into memory when the open handler itself is loaded, e.g. at boot time. This portion contains a list of the protocols that are associated with the network architecture to which the configurator pertains. Also contained within this portion is a list of control streams that have been created by the configurator. When the open handler polls the configurators to determine whether any of them can configure a particular type of module (the "can configure" step), the configurator checks the list of protocols contained in its first portion 40. If the list does not contain the protocol, the configurator responds in the negative and no further action is taken by the configurator. If the protocol is known to the configurator, it will respond positively.

When a configurator responds with an indication that it can configure a particular module, the open handler issues the command to that configurator to configure the module (the "configure" step). In response, the configurator loads a second portion 42 of its library of routines. This portion contains the routines that are used to actually configure the module and create the stream. In operation, the routines contained in this portion of the configurator first determine whether the connection of components specified by the open handler is a recognized one. If so, an identification of this fact is returned to the open handler. If the configuration is not one that is recognized, the configurator uses its built-in rules to attempt to create a valid configuration by inserting one or more modules below it in the configuration. It then returns either an error indication or the valid configuration to the open handler.

When the configurator is reinvoked the last time to create the stream, it checks a list of control streams to determine whether a control stream with the specified configuration already exists. If such a control stream exists, the configurator responds to the request by "cloning" the control stream, i.e. setting up a reference to the control stream, and returning it to the open handler. If no such control stream is in existence, the configurator creates the control stream, placing it and the configuration information on the list of control streams. It then returns a clone of the control stream to the open handler.

It is also possible to have configurators for protocols that do not use a control stream. In cases like these, the configurator exists solely to validate and create the configuration. For example, implementations of serial drivers do not normally require a control stream.

A more detailed description of the features and operation of the system depicted in FIG. 5 will be set forth hereinafter with reference to specific examples.

When the user desires to construct a stream for a particular protocols a command is sent to the handler 36 to open the stream. Included within the command is an identification of one or more protocols to be employed. Optionally, the user can also specify one or more device drivers. This identification is called a "configuration". For example, the user might send a command to open a stream having the configuration shown in FIG. 7A, in which a DDP module 44 is connected to an Ethernet driver 46. The description of this proposed configuration can be supplied in any suitable form. For example, it might be a simple text command, such as "ddp, enet", or it can be a more complex data structure, such as a graphic of the type shown in FIG. 7A. The proposed configuration can represent any possible combination of modules and drivers, including those which are not workable.

In response to the open command, the open handler 36 selects the topmost module in the structure, in this case the DDP module, and sends an inquiry to each of the configurators 38, asking if any of them is capable of configuring a DDP module. The DDP protocol is employed in networks based on the AppleTalk network architecture. Therefore, the library 38a associated with AppleTalk generates a positive response to the inquiry.

When the open handler receives this response, it sends a command to the responding configurator to configure the module. The configurator then loads a routine which enables it to create a legitimate connection with the module. In the case of a DDP module, an intermediate module (called an ADEV) is required. The AppleTalk configurator is aware of this, through its stored routines, and inserts the appropriate ADEV module 48 into the configuration between the DDP module and the Ethernet driver, resulting in the configuration shown in FIG. 7B. The open handler is re-invoked to configure the ADEV stream 50. At this point, the configurator for AppleTalk is invoked recursively to configure the ADEV module. In this particular example, the AppleTalk architecture requires two different protocol types when using Ethernet, so the configurator inserts a second Ethernet driver 52 under the ADEV stream, as shown in FIG. 7C, and reinvokes the open handler to configure each Ethernet driver.

A "standard" configurator can be provided which understands that Ethernet is a driver, and therefore just needs to be "opened". As long as a configurator for the Ethernet driver does not exist, the "standard" configurator can claim responsibility for configuring the Ethernet driver. At this point, the whole process has completed without an error, and a valid configuration has been created.

Once a valid configuration has been created, the open handler 36 re-invokes the AppleTalk configurator to actually construct the stream. The AppleTalk configurator determines if it already has created a stream with these specifications. If it has, it simply clones a copy of the stream and returns it to the open handler. If it has not, the open handler is re-invoked to construct the ADEV stream 50 (which re-invokes the open handler to construct the Ethernet streams). The actual construction of the stream is carried out by issuing the appropriate "open", "push" and "link" commands to the streams facility of the operating system. The required commands for a particular construction are stored in the configuration routines of the configurator. Once the ADEV stream is constructed, the DDP module 44 is opened, and the ADEV stream is linked under it. This control stream is then stored in the AppleTalk configurator, along with the information about the configuration, so that subsequent attempts to open this stream simply clone the control stream. A clone of the "control" stream is then returned to the open handler.

Figure 8A:
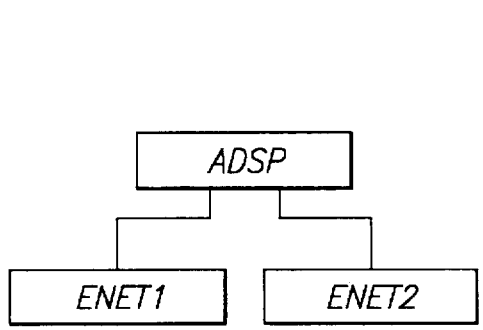
FIGS. 8A, 8B and 8C illustrate respective states in the construction of a second example of a user-commanded configuration for a stream.

FIG. 8A illustrates a second example of a possible data path configuration that might be sent by the user with the open command. In this case, an ADSP module is linked to two Ethernet drivers, which is not a legitimate configuration. As before, the open handler 36 polls each of the configurators 38, asking which one can configure an ADSP module. This module is also within the AppleTalk suite of protocols, and so the configurator 38a provides a positive response. The open handler then issues a command to configure the module, which causes the configurator to load a routine associated with that module.

Figure 8B:
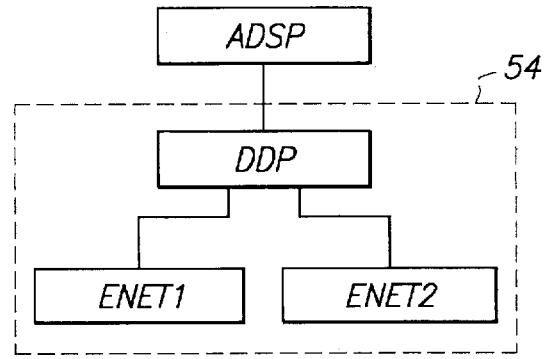
Figure 8C:
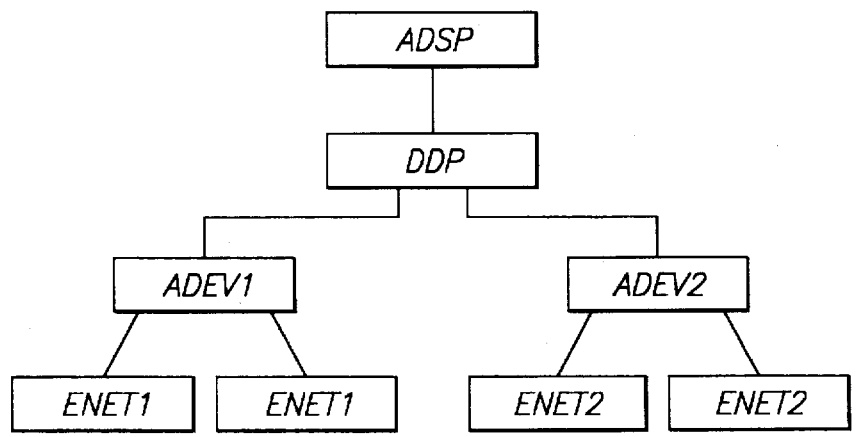

Since an ADSP module cannot be directly linked to an Ethernet driver, the configurator attempts to find a legitimate configuration. Stored within the configurator's routine are rules to help identify legitimate connections for a given module. In the present case, an ADSP module can be linked to a DDP module. Therefore, the configurator places a DDP module below the ADSP module in the configuration, as shown in FIG. 8B. The configurator then reinvokes the open handler to configure the DDP stream 54, which then goes through similar steps as indicated in the previous example. The result of this operation is a new proposed configuration shown in FIG. 8C, in which a DDP module and associated ADEV modules are interposed between the ADSP module and the Ethernet drivers.

The open handler 36 is then re-invoked to construct the stream. As before, it asks the AppleTalk configurator to construct the stream. The configurator asks the open handler to construct the DDP stream. This causes a second invocation of the AppleTalk configurator, which returns a "cloned" version of the control stream to the first invocation. The first invocation then "pushes" the ADSP module onto the "cloned" DDP stream and returns the stream to the open handler.

Figure 9C:
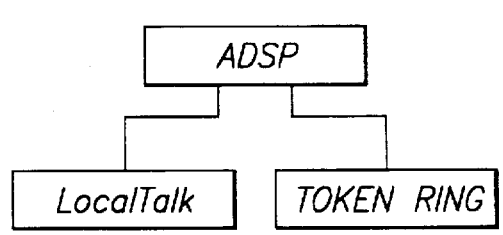
Figure 9C:
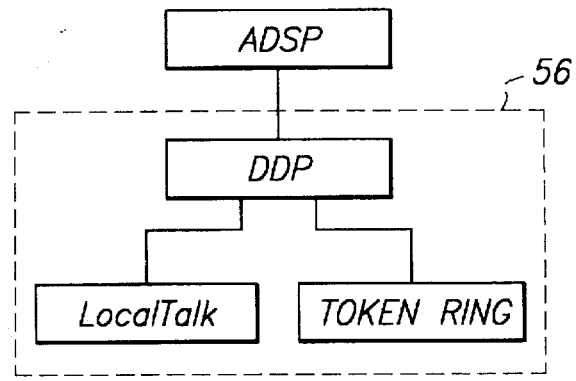
Figure 9C:
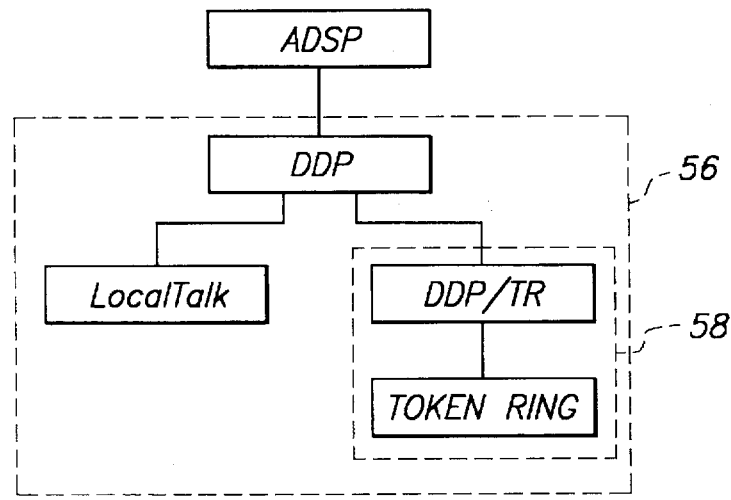

A third example of a user-requested stream is shown in FIG. 9A. In this example, an ADSP module sits above two different device drivers, one for a LocalTalk network and one for a token ring network. When this structure is passed to the open handler, it proceeds in the same manner as described above with respect to the example of FIG. 8A. As a result, the structure of FIG. 9B is formed, where a DDP module is inserted between the ADSP module and the I/O drivers. This new configuration forms a first control stream 56, which the open handler then attempts to create by means of a call to configure the DDP module. In this case, the DDP module can be linked to the LocalTalk driver, but not to the token ring driver. Consequently, the routine for configuring the DDP module causes a new ADEV module, labeled DDP/TR, to be inserted between the DDP module and the token ring driver, as shown in FIG. 9C. This configuration results in a second control stream 58 being formed. The open handler stores this new configuration, and then attempts to construct this control stream in the same manner as described previously.

The open handler operates this way in a recursive manner to both configure and construct the stream, beginning with the lowest, or innermost, control stream. If it is not able to construct such a stream, an error message is generated and no further efforts are taken. If, however, the stream 58 can be constructed, the open handler proceeds to construct the next stream 56, by linking the DDP module to the LocalTalk driver and to the DDP/TR module of the lower stream 58. Once this is carried out, the ADSP module is then pushed above the DDP module, to complete the stream.

When a control stream is constructed, it can be cloned for use in different data path streams. For this purpose, each control stream has a configuration and a usecount associated with it, which are stored in the first portion 40 of the associated configurator. When the stream is first constructed, its usecount is set to a value of one. For each subsequent use of the control stream in another stream, the value of the usecount is incremented. Conversely, each time a stream cloned from the control stream is closed, or dismantled, the usecount is decremented. When the usecount decrements to a value of zero, the control stream itself can be dismantled.

From the foregoing, it can be seen that the present invention provides a system that enables data paths for internetwork communications to be created during the run time of a computer. The user can specify any desired combination of protocol modules and I/O drivers, and the system attempts to construct a legitimate data path that utilizes the specified components. It will be appreciated by those skilled in this technology that the present invention can be embodied in other specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A system for constructing network communication data paths during the run time of a computer, comprising:

a plurality of configurator code modules, each of which contains information pertaining to the configuration of communications protocols that are associated with respective network architectures; and a handler which receives commands from a user that specify first and second function modules that are to be linked together to construct a data path that operates with a specified protocol, determines which one of said configurator modules is associated with the specified protocol, and commands said one configurator module to construct a data path which operates with the specified protocol, wherein said one configurator code module determines whether said first and second function modules can be legitimately linked and, if they cannot, identifies a third module that can be legitimately linked to the first function module.

2. The system of claim 1 wherein said configurator code modules generate a configuration containing a plurality of components that are legitimately linkable to one another in response to a user command, and said open handler recursively commands said configurator modules to construct a data path containing each of said components.

3. The system of claim 1 wherein said handler determines whether one of said configurator modules is associated with the third function module and controls such configurator module to construct a first data path which contains said second and third function modules, and subsequently controls the configurator module associated with the first function module to construct a data path which contains the first function module and the first data path.

4. The system of claim 1 wherein one of said function modules is associated with said specified protocol.

5. The system of claim 4 wherein said third function module is associated with a protocol other than said specified protocol.

6. The system of claim 1 wherein one of said function modules is a device driver.

7. A system for constructing network communication data paths during the run time of a computer; comprising:
 a plurality of configurator code modules, each of which contains information pertaining to the configuration of communications protocols that are associated with respective network architectures, wherein each of said configurator modules comprises a first portion that is resident in computer memory and which contains a list of protocol modules associated with the configurator module, and a second portion that is selectively loadable into memory and which contains routines for configuring a data path in accordance with a specified protocol module; and
 a handler which receives commands from a user to construct a data path that operates with a specified protocol and polls said configurator modules to determine which one is associated with the specified protocol and commands said one configurator module to construct a data path which operates with the specified protocol.

8. The system of claim 7 wherein a configurator identifies itself as capable of configuring a particular protocol module, in response to an inquiry from said open handler which identifies said particular protocol module, based on information contained in said first portion, and loads said second portion into memory in response to a command from said open handler to configure said particular protocol module.

9. A method for constructing network communication data paths during the run time of a computer, comprising the steps of:
 storing a plurality of configurator code modules in memory of the computer, wherein each configurator module contains information pertaining to the configuration of communications protocols that are associated with respective network architectures;
 receiving a command from a user to construct a data path in accordance with a specified protocol;
 determining which one of said configurator modules is associated with the specified protocol;
 commanding the determined one of said configurator modules to configure a data path containing a first function module which operates in accordance with the specified protocol; and
 determining in the command configurator module whether a particular configuration of said first function module and a second function module is legitimate and, if it is not, identifying a third function module to be linked to the first function module to form a legitimate configuration.

10. The method of claim 9 wherein the step of determining which configurator module is associated with the specified protocol comprises the steps of successively polling the configurator modules, and sending a positive response from the configurator module that is associated with the specified protocol.

11. The method of claim 9 further including the step of determining which configurator module is associated with the third function module, and controlling the determined configurator module to configure a data path containing said second and third function modules, to create a legitimate configuration.

12. The method of claim 11 further including the step of recursively invoking said configurator modules to construct a data path containing function modules in a legitimate configuration identified by said configurator modules.

13. A method for constructing network communication data paths during the run time of a computer, comprising the steps of:
 storing a first part of a plurality of configurator code modules in memory of the computer, wherein each configurator module contains information pertaining to the configuration of communications protocols that are associated with respective network architectures and said first part identifies protocols with which the configurator modules are respectively associated;
 receiving a command from a user to construct a data path in accordance with a specified protocol;
 determining which one of said configurator modules is associated with the specified protocol;
 commanding the determined one of said configurator modules to construct a data path which operates in accordance with the specified protocol; and
 selectively loading a second part of said determined one of said configurator modules, which contains routines for constructing a data path, in response to a command to configure a data path in accordance with a specified protocol.

14. The method of claim 9 wherein said third function module is associated with a protocol other than said specified protocol.

15. A method for constructing network communication data paths, comprising the steps of:
 storing a plurality of configurator code modules, wherein each configurator module contains information pertaining to the configuration of communications protocols that are associated with respective network architectures;
 receiving a command to construct a data path in accordance with a specified protocol;
 identifying a first one of said configurator modules that is associated with the specified protocol;
 configuring a first control stream, containing a first function module, with said first configurator module;
 identifying a second configurator module that is associated with said first function module;
 configuring a second control stream, containing a second function module, with said second configurator module; constructing said second control stream with said second configurator module; and
 constructing said first control stream, which contains the second control stream and said first function module, with said first configurator module.

16. The method of claim 15 wherein said first configurator module and said second configurator module are the same configurator module.

17. A method for constructing network communication data paths, comprising the steps of:
 storing a plurality of configurator code modules, wherein each configurator module contains information pertaining to the configuration of communications protocols that are associated with respective network architectures;

receiving a command to construct a data path in accordance with a specified protocol;

identifying a first one of said configurator modules that is associated with the specified protocol;

configuring a first portion of a control stream, containing a first function module, with said first configurator module;

identifying a second configurator module that is associated with said first function module;

configuring a second portion of said control stream, containing a further function module, with said second configurator module; and recursively calling each of the identified configurator modules to construct the associated portions of the control stream.

18. The method of claim 17 wherein said first configurator module and said second configurator module are the same configurator module.

* * * * *

UNITED STATES PATENT AND TRADEMARK OFFICE
CERTIFICATE OF CORRECTION

PATENT NO : 5,751,972

DATED : May 12, 1998

INVENTOR(S) : Michael Quinn, et al.

It is certified that error appears in the above-identified patent and that said Letters Patent is hereby corrected as shown below:

In the claims:

Claim 13, line 11, (column 10, line 20), delete "cornnand" and insert therefor --command--.

Claim 15, line 18, (column 10, line 53), after the semicolon a new paragraph should begin starting with "constructing".

Signed and Sealed this

Thirtieth Day of March, 1999

Attest:

Attesting Officer

Q. TODD DICKINSON

Acting Commissioner of Patents and Trademarks